United States Patent [19]

Diggs

[11] 4,000,850
[45] Jan. 4, 1977

[54] SOLAR HEATED AND COOLED MODULAR BUILDING

[76] Inventor: Richard E. Diggs, 12A Road, Carthage, Mo. 64836

[22] Filed: May 14, 1975

[21] Appl. No.: 577,359

[52] U.S. Cl. .................................. 237/1 A; 52/168; 52/173 R; 52/220; 126/271; 165/48
[51] Int. Cl.² .................................................. F24J 3/02
[58] Field of Search .......... 237/1 A; 126/270, 271; 52/173, 220, 168; 165/47, 48

[56] References Cited

UNITED STATES PATENTS

| 2,553,302 | 5/1951 | Cornwall | 126/271 |
| 2,641,449 | 6/1953 | Antony | 52/220 |
| 3,500,596 | 3/1970 | Andersson | 52/220 |
| 3,893,506 | 7/1975 | Laing | 126/271 |

FOREIGN PATENTS OR APPLICATIONS

| 28,273 | 12/1910 | United Kingdom | 126/271 |

Primary Examiner—Kenneth W. Sprague
Assistant Examiner—James C. Yeung
Attorney, Agent, or Firm—Shoemaker and Mattare, Ltd.

[57] ABSTRACT

A solar heated and cooled modular building includes insulated prefabricated wall and roof panels supported on prefabricated tubular wall columns and roof beams. Fluid circulating means is connected with the columns and beams to circulate fluid therethrough at a desired temperature from a source of the fluid to maintain a desired temperature in the building. A plurality of solar panels are supported on the roof of the building and a heat pump is connected therewith to circulate a heat exchange fluid through the panels to absorb heat. The heated heat exchange fluid is then used to obtain the desired temperature of the fluid circulated through the columns and beams.

19 Claims, 12 Drawing Figures

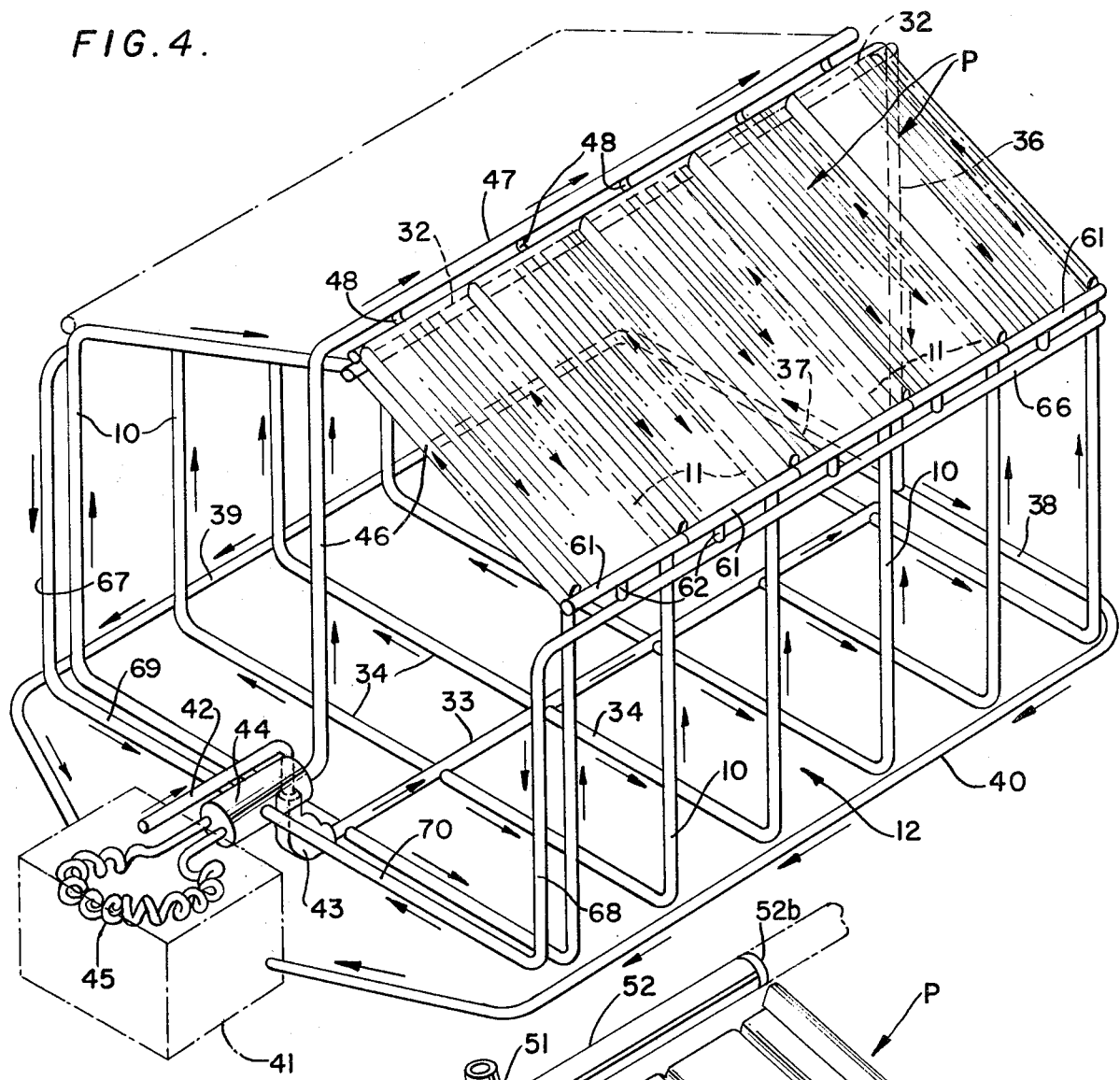

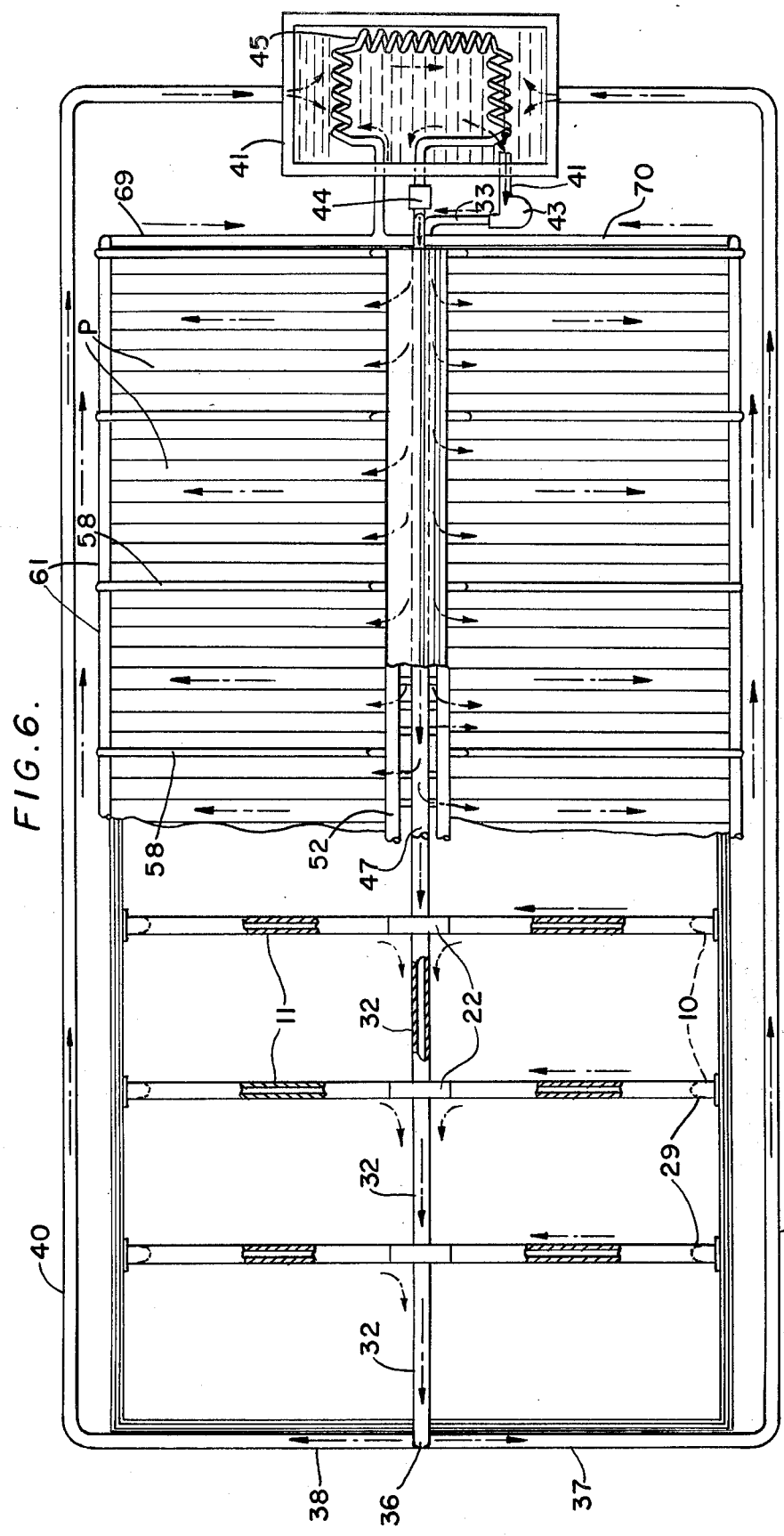
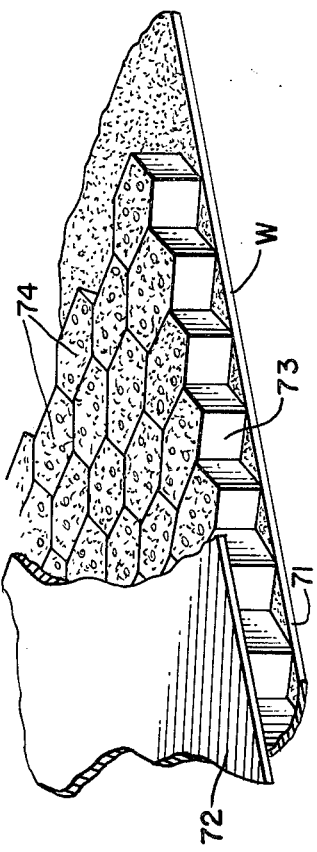
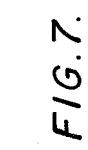
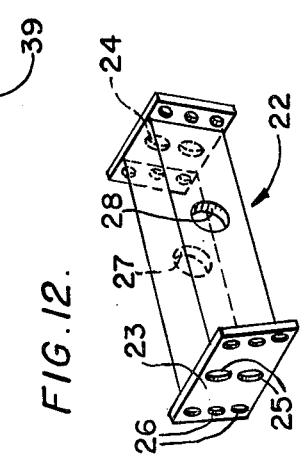
FIG. 6.
FIG. 7.
FIG. 12.

SOLAR HEATED AND COOLED MODULAR BUILDING

BACKGROUND OF THE INVENTION

This invention relates to building constructions, and in particular, to an economical, easily assembled and disassembled building which is substantially fireproof and which utilizes natural energy sources for heating and cooling.

Many types of building constructions are known in the prior art which have means for utilization of solar energy and the like to heat and/or cool the building. Further, some such prior art structures utilize fireproof materials and/or modular construction. However, all of these prior art devices utilize a substantially conventional construction, with modifications thereto to accommodate the modular building concept or the use of solar energy or other natural energy sources for heating and/or cooling of the building. None of the prior art devices known to applicant teach a completely new building construction as disclosed by applicant herein, wherein a prefabricated, tubular frame is used through which liquid is circulated to heat and/or cool the building, and in which a plurality of rigid, insulated, prefabricated panels are secured to the frame on the roof and walls thereof to form the building, and with solar panels supported on top of the roof through which a heat exchange fluid is circulated to absorb solar energy and then used to obtain the desired temperature in the fluid circulated through the frame of the building.

Thus, although modular building constructions are known in the prior art, and although solar energy powered buildings are known in the prior art, heretofore there has not been any economical and practicable construction or method of providing an essentially fireproof building which is of modular construction and which may be easily and economically erected or disassembled, and which utilizes economical solar energy means to heat and/or cool the building. More particularly, heating and cooling of the building in accordance with applicant's invention is accomplished by circulation of a heat exchange fluid through the frame of the building.

With applicant's construction, wherein radiant heat from the floor, walls and roof is used to heat the building, a savings of at least 70% in the amount of energy required to heat the building is obtained. Similar results are obtained for cooling the building. Additionally, factory production of standard components used to erect the building reduce costs by about 30%, and the ease with which the building can be erected results in a substantial savings in time to erect the building, and an additional 20% reduction in cost of the building, as compared with conventional constructions.

Further, a building constructed in accordance with applicant's invention has a structural strength approximately five times as great as a building of wood frame construction. Moreover, because of the ease with which the building may be erected and disassembled, it is possible that the building could be disassembled and moved when the owner of the building leaves the area, thus eliminating the necessity of purchasing a new home or building at a new location. The existing building would simply be disassembled and then erected at the new location. Still further, the unique construction of applicant's building eliminates the necessity of providing interior supports, so that the interior of the building is open and free, whereby there is great latitude in room arrangements to meet different requirements or desires. A still further advantage to applicant's invention is that the unique modular construction of the building enables buildings to be stocked and sold in volume, much in the nature of automobiles and other such objects, thus providing a further reduction in cost.

OBJECTS OF THE INVENTION

Accordingly, it is an object of this invention to provide a building construction which is essentially fireproof and which may be easily assembled and disassembled, and which utilizes solar energy for heating and cooling.

Another object of the invention is to provide a building construction in which the building includes a frame comprising tubular wall columns and roof beams supported on the columns, and means for circulating a heat exchange liquid through the columns and beams to either cool or heat the building, as desired, and wherein a plurality of solar panels are supported on the roof of the building for circulation of a heat exchange fluid which absorbs solar energy, and the heated heat exchange fluid is used to produce the desired temperature in the fluid circulated through the beams and columns.

A still further object of the invention is to provide an economical and effective solar panel for absorbing solar energy to heat a heat exchange fluid for utilization of the solar energy.

BRIEF DESCRIPTION OF THE DRAWINGS

FIG. 4 is a schematic, perspective view of the fluid systems in the building according to the present invention.

FIG. 5 is an enlarged, perspective view with a portion broken away of a solar panel in accordance with the invention, shown separated from the inlet header thereof.

FIG. 6 is a somewhat schematic, top plan view of a building in accordance with the invention, further illustrating the fluid systems used in the building.

FIG. 7 is an enlarged, fragmentary, perspective view, with portions broken away, of one of the wall and roof panels used in the building construction.

FIG. 12 is a perspective view of the beam connector used to interconnect adjacent upper ends of the roof beams.

DETAILED DESCRIPTION OF THE INVENTION

Figure 1:
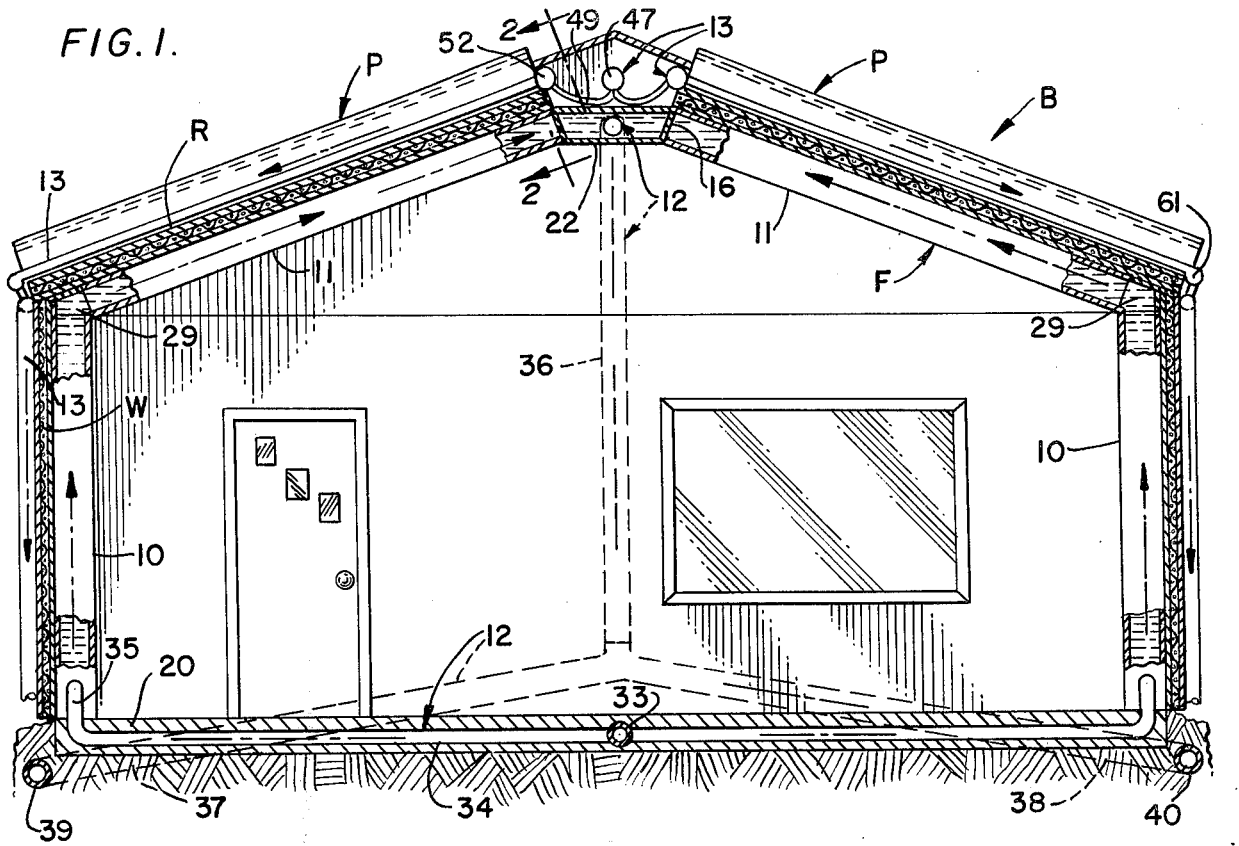
FIG. 1 is a transverse, sectional view of a building in accordance with the invention, showing the relationship of wall columns, roof beams, wall and roof panels, and fluid circulating means in accordance with the invention.

In the drawings, wherein like reference numerals indicate like parts throughout the several views, a building in accordance with the invention is indicated generally at B and comprises a frame F having substantially vertically extending wall columns 10 and inclined roof beams 11 connected to and supported on the upper ends of the columns 10. A plurality of substantially identical wall panels W are secured to the columns 10 to form the walls of the building, and a plurality of substantially identical roof panels R are supported on the roof beams 11 to form the roof of the building. Further, a plurality of solar panels P are supported on the roof panels for absorbing solar energy to heat a fluid heat exchange medium for use as desired.

A first fluid circulating system 12 is connected with the frame F of the building for circulating a heat exchange fluid therethrough to either heat or cool the building as desired, and a second fluid circulating system 13 is connected with the solar panels P to collect and circulate a heated fluid medium to a means for conversion of the heat energy into a desired form, as for example, to heat or cool the fluid circulated through the frame F.

In order to simplify construction of the building, and in order to reduce the cost thereof, the wall columns 10 and roof beams 11 are substantially identical in construction, with the columns and beams being made in standard, predetermined lengths, as desired, for construction of buildings or portions of buildings of different size.

The columns and beams both comprise an elongate, substantially U-shaped channel 14 of aluminum or other suitable material, and which may be formed on a roll mill. The elongate, open side edge of the channels 14 are closed by an elongate, flat plate 15 suitably secured to the channel, as by means of welding or the like. For example, if the channel comprises aluminum, the plate is heliarc or plasma welded thereto. Similarly, opposite open ends of the channels 14 of the roof beams 11 are closed by flat, substantially rectangularly shaped plates 16 having a plurality of bolt receptive openings or holes 17 along opposite edges thereof, and a plurality of fluid passages or ports 18 therethrough in communication with the open chamber or cavity defined by the U-shaped channel member 14. The upper ends of the columns 10 are similarly closed by plates 16 welded to the ends of the channels 14 thereof, having bolt receptive openings or holes 17 along the edges thereof and fluid flow passages 18 in communication with the cavity or chamber defined by the channel 14. The bottom open ends of the columns 10, however, are closed by substantially flat, rectangular plates 19, which have a plurality of bolt receptive openings through the peripheral portions thereof, whereby the plates 19 and thus the columns 10 may be securely bolted or otherwise secured to a concrete foundation, such as footer or floor or the like 20 by means of bolts or other suitable fasteners 21.

Adjacent, upper ends of the roof beams 11 are interconnected by a hollow beam connector 22, having opposite, sloping end walls or plates 23 and 24, with fluid flow passages 25 therethrough and bolt receptive openings 26 at opposite edges thereof, whereby the upper ends of the roof beams may be bolted to the beam connector 22 to establish fluid flow communication between the hollow beams and beam connector. Fluid flow passages or openings 27 and 28 are also formed through the opposite walls of the beam connectors 22 for connection to the first fluid flow system 12, to be later described. Similarly, the lower ends of the roof beams 11 and the upper ends of the wall columns 10 are interconnected by eaves angle members 29 comprising hollow elbows 30 having a substantially flat, rectangular plate 16' welded to the bottom end thereof of substantially identical construction to the plates 16 on the upper ends of the columns 10, and also having plates 16' on the upper ends thereof substantially identical to the plates 16 on the lower ends of the beams 11.

The eaves angles 29 may be manufactured in three standard roof angle ratios of 1 to 10, 2 to 10 and 3 to 10, or other ratios are desired. Similarly, the beam connectors 22 may be manufactured with corresponding ratios on the oppositely sloping ends thereof, such that merely by substitution of different angles or connectors, roofs having different pitches may be constructed. The beam connectors and eaves connectors are connected with respective adjacent ends of the columns and beams by means of bolts or other suitable fasteners 31 extended through the openings in the end plates thereof.

Short lengths of pipe 32 are connected to and extend between the openings 27 and 28 of adjacent beam connectors 22, as seen best in FIG. 6, for example.

The primary fluid flow system 12 includes the tubular columns 10 and roof beams 11 and the eaves connectors 29 and beam connectors 22 and pipes 32. Further, the first fluid flow system includes an elongate header pipe 33 embedded in the floor of the building, as for example, in the concrete slab 20 or the like, and running the length of the building. A plurality of substantially equally spaced apart pipes 34 are connected with the header pipe 33 and extend outwardly to the bottom ends of the columns 10, and are connected with the columns through pipe fittings or elbows 35, which project upwardly from the floor 20 and into the sides of the channels 14 of the columns 10. A substantially vertically extending fluid return pipe 36 is connected with the pipes 32 and extends downwardly from the peak or ridge of the building to adjacent the floor thereof, and is connected at its lower end with a pair of outwardly extending branch return pipes 37 and 38, which are in turn joined through elbows with a pair of longitudinally extending return pipes 39 and 40 at opposite sides of the building, which extend to a fluid reservoir 41. Fluid is supplied to the first fluid circulating system through an inlet pipe 42 connected with the fluid reservoir 41 near the upper end thereof, and connected with the inlet of a circulating pump 43. The header pipe 33 is connected with the outlet of pump 43, whereby upon operation of the pump, fluid from the reservoir 41 is caused to circulate through header pipe 33 and outwardly through the supply pipes 34 to the columns 10, and thence upwardly through the columns and roof beams 11 to the beam connectors 22 and pipes 32 and thence downwardly through return pipes 36, 37, 38, 39 and 40 back to the reservoir 41.

The fluid circulated through the first fluid circulating system may be heated or cooled as desired to maintain a desired temperature in the building by means utilizing the energy developed through use of the solar panels P. This means includes a heat pump 44 having a heat exchange coil 45 associated therewith, with the heat exchange coil disposed in the fluid in fluid reservoir 41 to effect the desired temperature change thereof. The heat pump and coil are part of the second fluid circulating system, including the solar panels P, and the heat pump is connected with an outlet riser or supply pipe 46 extending upwardly to a supply header pipe 47 extending along the peak or ridge of the building above the beam connectors 22, and having a plurality of outlet bosses 48 thereon corresponding with the approximate center location of respective adjacent solar panels P. Short lengths of Teflon hose or other suitable flexible fluid conduit means 49 are secured at one of their ends to the bosses 48 by means of hose clamps or the like 50, and are similarly secured at their other ends to bosses 51 on supply manifold pipes 52 connected with the upper ends of the panels P.

As seen best in FIG. 5, the manifold pipes 52 have elongate slots 53 extending along the side thereof opposite the bosses 51, and the panels P are welded to the slot. The opposite ends of the pipes 52 may be closed with caps 52a and 52b, if desired.

Figure 2:
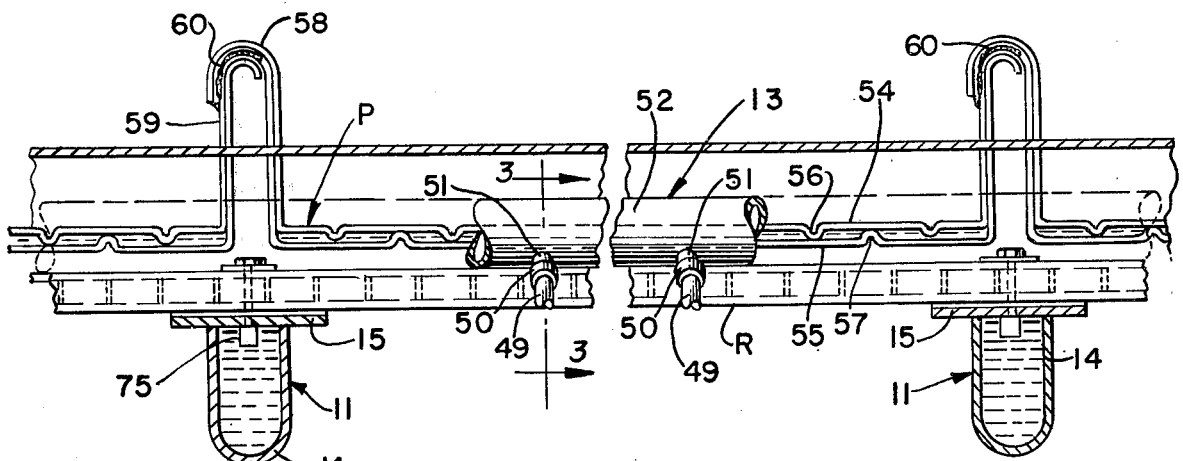
FIG. 2 is a greatly enlarged, sectional view taken along line 2—2 in FIG. 1.
Figure 3:
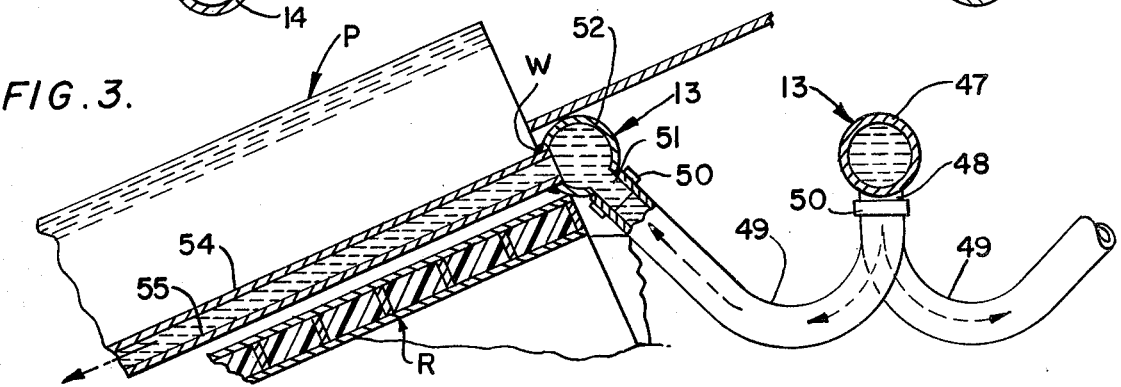
FIG. 3 is a greatly enlarged, fragmentary, sectional view taken along line 3—3 in FIG. 2.

As seen in FIGS. 2 and 5, the panels P each comprise an upper sheet 54 of aluminum or other suitable material, and a lower sheet 55 of aluminum or other suitable material. The top sheet or panel 54 has a plurality of elongate, substantially parallel ribs or protrusions 56 formed therein, and the bottom sheet or panel 55 has a plurality of similar ribs or protrusions 57 formed therein, such that when the sheets or panels are assembled, the ribs of the respective sheets engage the opposite sheet to hold the sheets or panels in spaced apart relationship to define a fluid flow passage or plurality of parallel fluid flow passages between the top and bottom sheets or panels.

In a typical embodiment of the invention, the ribs have a depth of approximately 3/16 of an inch. The sheets or panels 54 and 55 may be formed at high speed on a roll mill or the like, if desired. Further, the upper panel 54 is coated with a special black finish, recently developed by Olin Company, which absorbs almost 97% of the solar energy striking the panel.

The upper and lower sheets of the panels P are secured together by means of upstanding, generally hook-shaped locking flanges along opposite edges thereof, and the locking flange 58 along one edge of each panel is larger than the locking flange 59 along the other edge thereof. Accordingly, when a plurality of panels P are placed in operative position, the smaller locking flange 59 along the edge of one panel is snugly engaged and received beneath the larger locking flange 58 along the adjacent edge of an adjacent panel P. This is illustrated best in FIG. 2, and the seam between the locking flanges 58 and 59 of adjacent panels is suitably sealed, as with a rubber mastic or the like 60.

Figure 8:
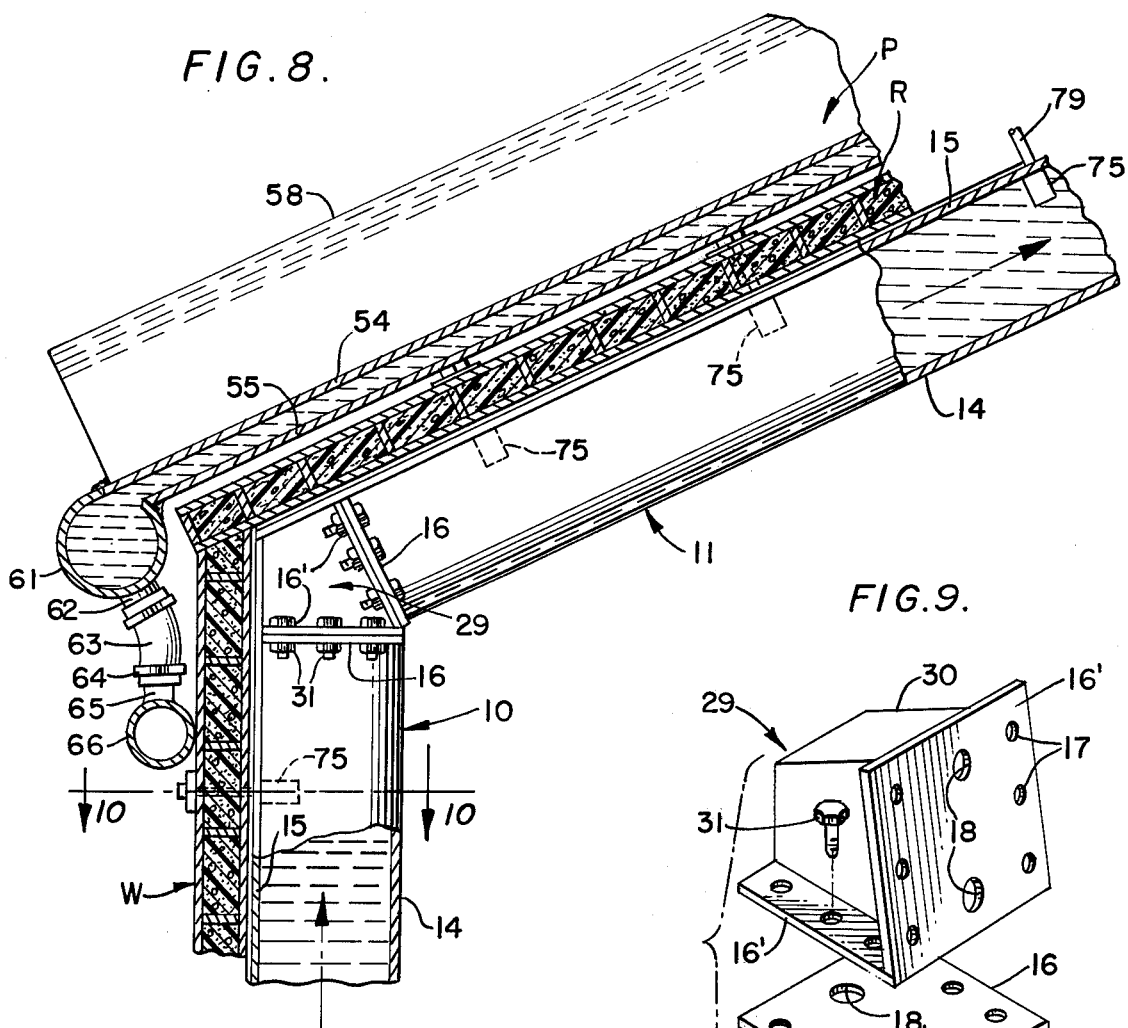
FIG. 8 is a greatly enlarged, fragmentary view in elevation, with portions broken away, of the connection and arrangement between the upper end of a wall column and the lower end of an inclined roof beam, and showing the relationship of wall and roof panels thereto and a solar panel on top of the roof panels.
Figure 9:
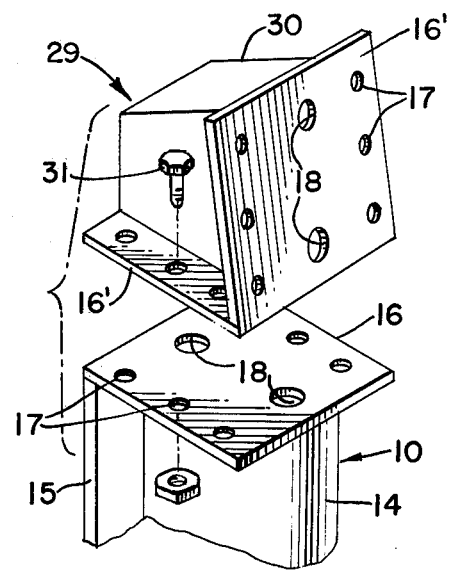
FIG. 9 is an enlarged, exploded, perspective view of the upper end of a wall column, and the eaves angle used to determine the pitch of the roof and to join the roof beams with the wall columns.

The upper open ends or edges of the panels P are placed in registry with the slots 53 in the sides of manifold pipes 52 and welded thereat to form a leaktight connection between the panels and manifolds 52. Similarly, outlet manifold pipes 61 are welded along the bottom edges of the panels P, and as seen best in FIG. 8, the outlet manifold pipes 61 are welded such that they are essentially below the plane of the upper sheet 54 of the panels P, to thereby enable rainfall and snow and the like to flow or slide readily off of the inclined solar panels. The outlet manifold pipes 61 each has an outlet boss 62 at substantially the midpoint thereof, and a short length of hose, such as Teflon or the like 63, is secured to the each of the bosses 62 by means of a hose clamp or other suitable fastening means 64. The flexible hose or conduit 63 is connected at its other end with a boss 65 on a fluid return pipe 66, which extends along the eaves of the building at each side thereof, and which are joined to downwardly extending return pipes 67 and 68 at opposite sides of the building and thence through horizontally extending return pipes 69 and 70 to the heat pump 44. Thus, a suitable fluid heat exchange medium is confined in the closed fluid circulating system 13, including the heat pump 44, and is pumped by the heat pump through supply pipe 46 to the header pipe 47 and thence through bosses 48 to the panels P, where solar heat is absorbed by the fluid and the heated fluid is then returned through outlet manifolds 61 and return pipes 66, 67 and 68 to the pipes 69 and 70 and back to the heat pump 44, where the heated fluid is used in a conventional and well-known manner to either heat fluid circulated through the first fluid circulating system to thereby heat the building or is used to cool the fluid to cool the building.

The fluid heated in the solar panels could also be used to drive small steam drive turbines or other electrical energy producing devices to produce electrical energy in addition to heat or cooling, as desired.

The wall and roof panels, as noted previously, are substantially identically constructed, and these panels are approximately 8 feet wide and may come in one or more standard lengths. The wall and roof panels each comprise an outer face or skin 71 and an inner face or skin 72, each formed of a high density material, such as pressed wood or the like, as for example, masonite. A honeycomb core 73 of fireproofed paper or the like is sandwiched between the skins 71 and 72 and is glued or otherwise suitably secured thereto, and the spaces defined in the honeycomb core are filled with a fireproof insulation, such as zonolite or the like 74. The finished panels, including the skins 71 and 72 and the core and insulation material, are preferably approximately 4 inches thick, and these panels are not only extremely strong and are essentially fireproof, but have a very high thermal insulating quality.

Figure 10:
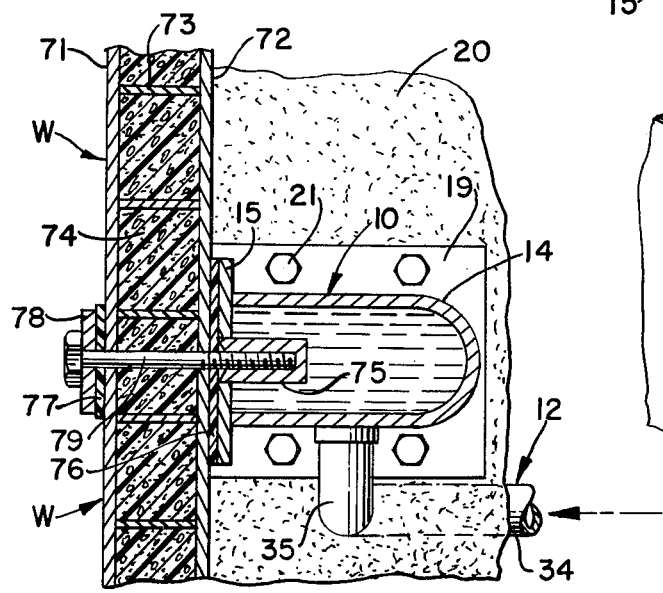
FIG. 10 is a view in section taken along line 10—10 of FIG. 8.
Figure 11:
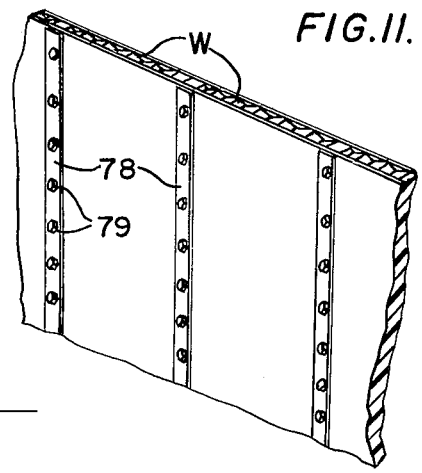
FIG. 11 is a fragmentary, perspective view of a plurality of panels in accordance with the invention, showing the manner in which the panels are secured to the frame of the building, and the joints between adjacent edges of adjacent panels sealed.

In order to secure the wall and roof panels to the frame of the building, a plurality of bolt receptive, internally threaded sockets 75 are welded or otherwise suitably secured at spaced locations along the plates 15 closing the elongate open sides of channels 14 of the columns 10 and roof beams 11. A typical spacing of these bolt sockets or lugs 75, for example, would be approximately one foot apart along the lengths of the columns and beams. The columns and beams are spaced apart a distance corresponding substantially to the width of the wall and roof panels, and accordingly, as seen in FIG. 10, a pair of adjacent panels are positioned in edge-to-edge relationship, with the seam therebetween extending substantially along the center line of the plate 15 of the columns and beams. A sealing strip or gasket 76 is interposed between the edges of the adjacent panels and the outer face of the plate 15 to effect a weather-tight seal thereat, and a sealing strip or gasket 77 is also placed along the seam at the outer skin of the panels, and a panel securing strip 78 is then positioned over the outer gasket 77 and bolts or the like 79 are then extended through holes provided in the strips 78 and into threaded engagement with the socket 75 in the columns and beams.

Thus, in order to construct a building in accordance with the invention, a suitable foundation or footing is provided, such as concrete slab 20 or the like, with the pipes 34 and 33 embedded therein, and the frame is then erected with the columns 10 and roof beams being connected by means of the eaves connectors 29 and beam connectors 22, and the wall and roof panels are then bolted in position on the frame, and the solar panels P are then simply glued to the outer surface of the roof panels. The various pipes and conduits comprising the first and second fluid circulating systems are then connected.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A solar heated and cooled modular building, comprising a frame including prefabricated tubular wall columns and prefabricated tubular roof beams supported on the columns, the columns and the beams being adapted to pass fluid therethrough, first fluid circulating means connected with the columns and beams to circulate a first heat exchange fluid therethrough at a desired temperature to maintain a desired temperature in the building, a plurality of rigid, prefabricated insulated panels secured to and supported on the columns and beams defining wall and roof structures, respectively, enclosing the building, a plurality of solar panels secured to and supported on the roof panels, second fluid circulating means connected with the solar panels to circulate a heat exchange fluid therethrough to absorb heat from solar energy and to use said heated heat exchange fluid to obtain the desired temperature of the first heat exchange fluid and plates secured to locations on the columns and roof beams which are adjacent each other and connecting those columns and beams to adjacent structure of the building, the plates each having flow passages defined therein to fluidly connect the columns and the beams.

2. A solar heated and cooled modular building as in claim 1, wherein the columns and beams are substantially identically constructed, and each comprises an elongate, substantially U-shaped channel, an elongate plate secured along the open edge of the channel closing the channel and defining a hollow flow passage for fluid through the beams and columns.

3. A solar heated and cooled modular building as in claim 2, further including a hollow angular eaves connector having a pair of angularly disposed plates thereon complemental in size and shape to the plates on the ends of the columns and beams, adjacent ends of the columns and roof beams being connected to said eaves connector, and means on said eaves connector for securing the columns and beams to the eaves connector, said plates in the eaves connector further having flow passage means therethrough to establish fluid flow communication from a column through the eaves connector and to a beam.

4. A solar heated and cooled modular building as in claim 1, wherein said columns and beams are substantially identically constructed and each comprises a generally U-shaped channel member having an elongate plate welded along the open side of the channel defining a closed fluid passageway through the beams and columns and an eaves connector connected between the upper ends of the columns and the adjacent lower ends of the beams, securing the beams to the columns in a desired angular relationship thereto, said eaves connectors having a pair of angularly disposed surfaces for connection to a plate on the upper end of the column and to a plate on the lower end of the beam, respectively, the angular disposition of said surfaces on said eaves connector being selected to determine a desired roof pitch.

5. A solar heated and cooled modular building as in claim 4, wherein a beam connector is connected between the adjacent upper ends of oppositely sloping roof beams, said beam connector having oppositely sloping end plates at opposite ends thereof for connection to the adjacent upper end plates of the beams.

6. A solar heated and cooled modular building as in claim 5, wherein the beam connectors each have a fluid flow passage opening formed through the opposite sides thereof for connection to fluid flow conduit means, so that fluid flow communication is established between adjacent beam connectors.

7. A solar heated and cooled modular building as in claim 1, wherein a plurality of substantially vertically disposed, parallel columns are spaced predetermined distances apart along the walls of the building, and one end of a roof beam is supported on the upper end of each column, with the roof beams extending generally upwardly from opposite sides of the building, and connected together at their adjacent ends, and means connecting together adjacent ends of adjacent roof beams in fluid flow communication relationship, fluid supply pipe means connected with the columns adjacent the lower ends thereof and connected with a source of fluid, fluid flow conduit means connected between adjacent roof beams at the upper ends thereof and conncted with fluid flow return means, said fluid flow return means connected with said source of fluid, and pump means connected with said source of fluid and with said fluid supply pipe means to supply fluid under pressure to said columns for flow of fluid upwardly through said columns and upwardly through said roof beams to the fluid flow conduit means connecting adjacent roof beams, and thence downwardly through said fluid flow return pipe means back to said fluid source and to the inlet of said pump, thus defining a closed fluid flow circulating system.

8. A solar heated and cooled modular building as in claim 7, wherein heat exchange means is in operative association with said source of fluid to obtain a desired temperature in said fluid.

9. A solar heated and cooled modular building as in claim 8, wherein said heat exchange means includes a heat pump connected with a heat exchange coil means disposed in said fluid, and fluid flow conduit means connected between said heat pump and said solar panels to effect circulation of a heat exchange fluid through said solar panels and to said heat pump to obtain the desired temperature of the fluid circulated through the columns and beams.

10. A solar heated and cooled modular building as in claim 1, wherein said insulated panels each comprises a pair of spaced, rigid, parallel skins, a fireproofed honeycomb core secured to and between the skins maintaining the skins in spaced apart relationship, and thermal insulation means filling the openings in the honeycomb core.

11. A solar heated and cooled modular building as in claim 10, wherein the skins comprise a high density pressed wood.

12. A solar heat and cooled modular building as in claim 11, wherein the insulated panels are substantially rectangular in shape, and the spacing between adjacent columns and beams is substantially the same as the width of the insulated panels, said panels being secured to the columns and beams in spanning relationship thereto, and means securing the panels to the columns and beams, said panel securing means comprising a plurality of spaced apart, threaded openings in the columns and beams, a resilient sealing gasket disposed between the columns and panels and the beams and panels, and a securing strip extended along the joint between adjacent panels, and bolt means extended through the securing strip and into the threaded opening in the columns and beams to secure the panels in position.

13. A solar heated and cooled modular building as in claim 12, wherein a sealing gasket is interposed between the strip and the adjacent edge portions of adjacent panels.

14. A solar heated and cooled modular building as in claim 1, wherein the solar panels are glued to the roof panels.

15. A solar heated and cooled modular building as in claim 14, wherein the upper surface of the solar panels exposed to solar energy is coated with a black solar energy absorbing coating.

16. A solar heated and cooled modular building as in claim 15, wherein the solar panels each comprises an upper and lower aluminum panel secured together along adjacent edges thereof and in spaced apart, parallel, overlying relationship to define a shallow, wide flow passage therebetween.

17. A solar heated and cooled modular building as in claim 16, wherein each of said aluminum panels has a plurality of elongate ribs therein, said ribs engaging the other panel to maintain the panels in spaced apart relationship, and also subdividing the wide, shallow flow passage therein into a plurality of smaller flow passages.

18. The solar heated and cooled modular buildings as in claim 1 wherein each solar panel comprises: upper and lower, substantially rigid, thermally conductive panels secured in closely spaced overlying relationship to one another defining a wide, shallow, open ended flow passage therebetween; said upper and lower panels having interlocking flange means along opposite side edges thereof securing the upper and lower panels together, and the interlocked flange means along opposite side edges of each solar panel being of different size and configured such that the flange means along one edge of one solar panel may be matingly secured and sealed to the flange means along an adjacent edge of an adjacent solar panel; inlet header means secured to one of the open ends of the solar panel, said inlet header means comprising a tube having a length substantially the same as the width of the solar panel and having a slot formed in the side thereof extending along substantially the entire length thereof, said one open end of the solar panel secured to the tube in registry with the slot, the upper panel secured and sealed to the tube at one side of the slot and the lower panel secured and sealed to the tube at the other side of the slot; and outlet header means secured and sealed to the other open end of the solar panel, said outlet header means comprising a tube having a slot therein and sealed to the solar panel similarly to said inlet header means.

19. A solar heated and cooled modular building, comprising a frame including prefabricated tubular wall columns and prefabricated tubular roof beams supported on the columns, a first heat exchange system including fluidly connected fluid circulating conduits formed by the tubular columns and beams, means to circulate a first heat exchange fluid through the first heat exchange system at a desired temperature to maintain a desired temperature in the building, a plurality of rigid, prefabricated insulated panels secured to and supported on the columns and beams defining wall and roof structures, respectively, enclosing the building, a plurality of solar panels secured to and supported on the roof panels, a second heat exchange system including fluid circulating conduits located within the solar panels, means to circulate a heat exchange fluid through the second heat exchange system to absorb heat from solar energy, heat exchanger means connected to both heat exchange systems to expose the fluid in the first system to the fluid in the second system so that heat will be transferred from the first fluid to the second fluid to obtain the desired temperature of the first heat exchange fluid, and plates secured to locations on the columns and roof beams which are adjacent each other, the plates connecting those columns and beams to adjacent structure of the building, the plates each having flow passages defined therein to fluidly connect the columns and the beams.

* * * * *